S. PATTON.
Corn-Harvesters.
No. 148,492. Patented March 10, 1874.
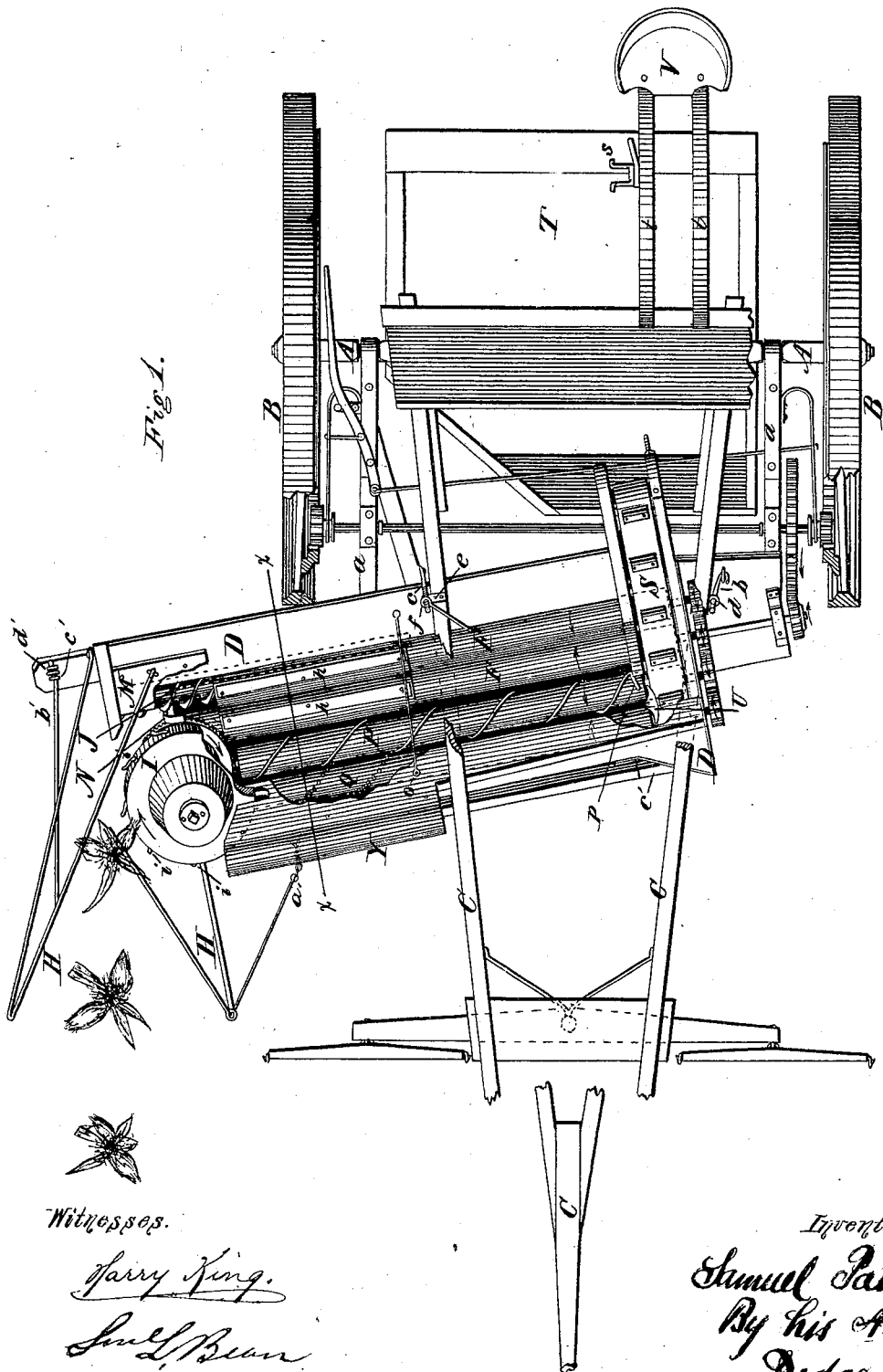
Witnesses.
Harry King.
Inventor.
Samuel Patton
By his Attys
Dodge & Son

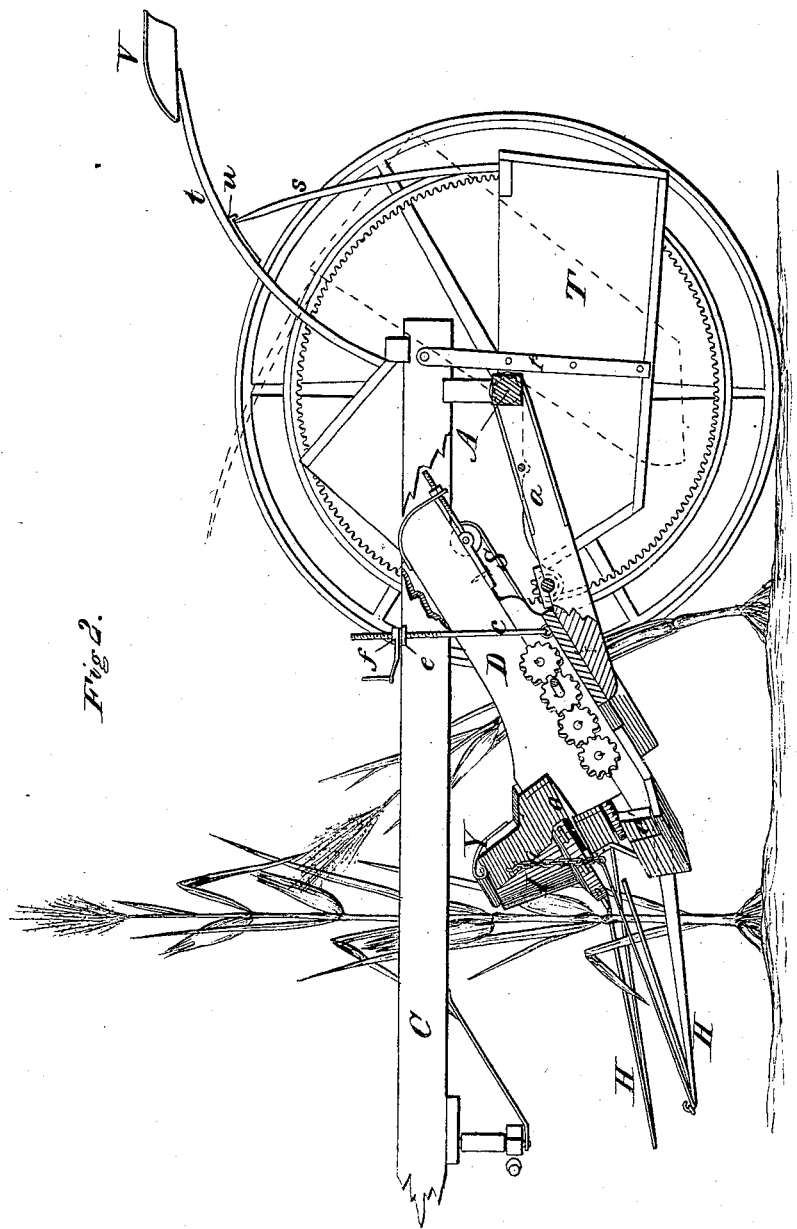

S. PATTON.
Corn-Harvesters.
No. 148,492.
3 Sheets--Sheet 3.
Patented March 10, 1874.
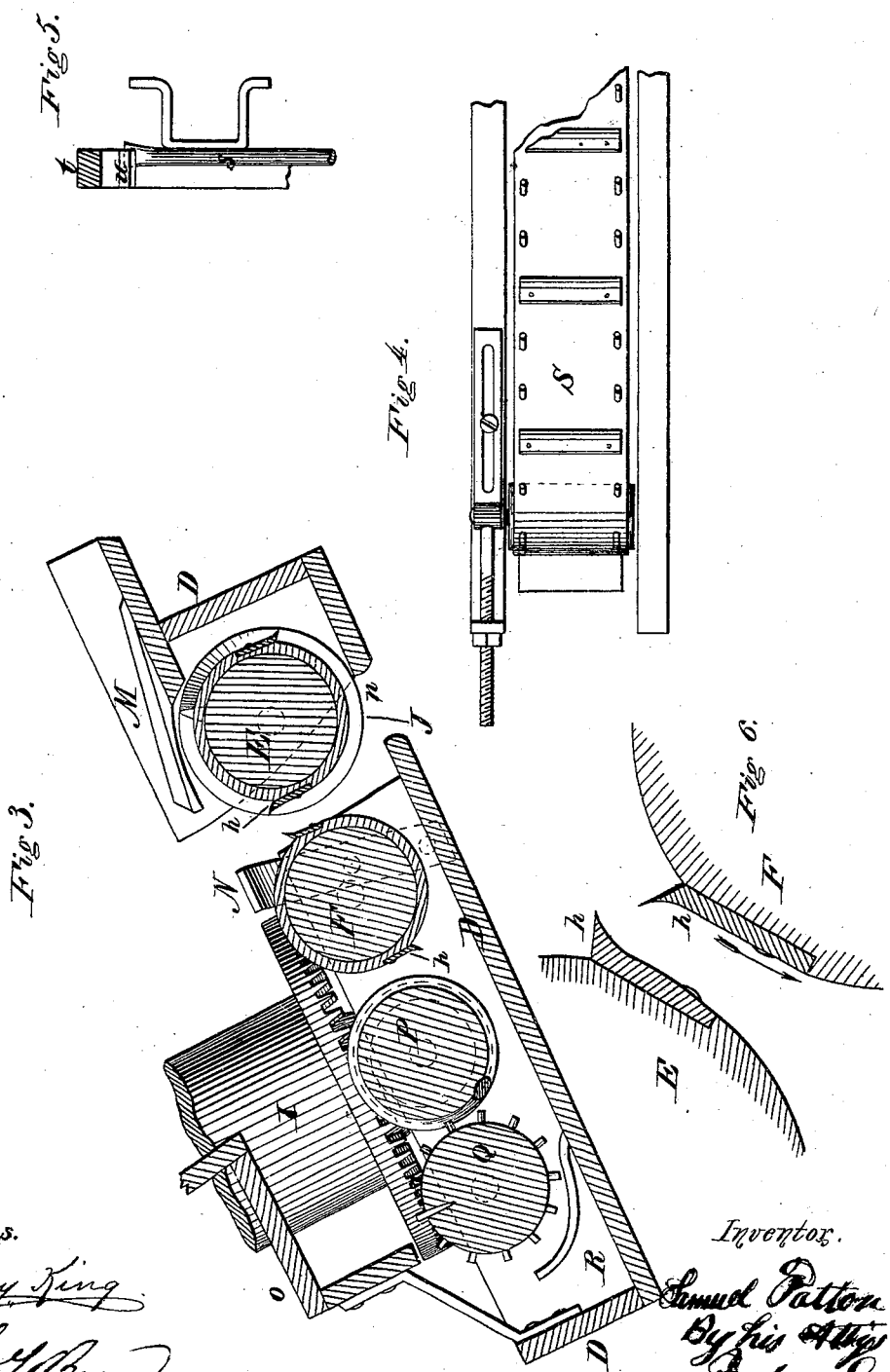

UNITED STATES PATENT OFFICE.

SAMUEL PATTON, OF CHATSWORTH, ILLINOIS.

IMPROVEMENT IN CORN-HARVESTERS.

Specification forming part of Letters Patent No. 148,492, dated March 10, 1874; application filed August 18, 1873.

*To all whom it may concern:*

Be it known that I, SAMUEL PATTON, of Chatsworth, in the county of Livingston and State of Illinois, have invented certain Improvements in Corn Harvesting and Husking Machines, of which the following is a specification:

This invention relates to improvements in that class of machines which husk the ears of corn from the standing stalks in the field, but more especially to improvements in the machine for which Letters Patent were granted to me April 22, 1873, No. 138,181. The improvements consist, mainly, in arranging the husking or picking rolls transversely of the machine, in such manner as to admit the standing stalks between them; in giving the edge of the lips on the husking-rolls a sharp outward curve; in a peculiar manner of arranging a spiral revolving head and other parts, to feed the stalks of corn between the husking or picking rolls; in the employment of a spirally-ribbed roll, a spirally-toothed roll, and stationary teeth, to remove all remaining husks and silk from the ears, and feed the ears to the delivering devices.

Figure 1 is a top-plan view of my machine, with portions slightly broken away to show other parts; Fig. 2, a longitudinal vertical section through the machine, on the line $x$ $x$ of Fig. 1, looking toward the main frame; Fig. 3, a section on the line $x$ $x$ of Fig. 1, looking outward toward the end of the rolls, the parts being enlarged; Fig. 4, an under view of the upper end of the elevating or delivering belt; Fig. 5, a view showing the manner in which the arm of the tilting corn-box locks against the seat-support; Fig. 6, a cross-section of the picking-rolls, showing the form of the lips thereon.

A represents the main axle, mounted loosely in two large wheels, B, and provided with a split or bifurcated tongue, C, the rear diverging arms of which are secured rigidly to the ends of the axle. The tongue is made in this form in order to stiffen and strengthen the machine, and to give support to parts hereinafter described. Below the tongue and forward of the wheels there is a transverse frame, D, on which all the picking and husking mechanism is mounted. This frame is provided with two rigid arms, which have their rear ends journaled on or around the axle A, as shown in Figs. 1 and 2, so that they hold the frame D from moving laterally, but permit it to swing up and down from the main axle as a center. The frame D has its forward end supported and prevented from falling to the ground by two rods, $b$ and $c$, which have their lower ends secured to the frame, and their upper ends attached to the tongue C, as shown in Figs. 1 and 2. The rod $b$ is passed through and held by an eyebolt, $d$, on the tongue, while the rod $c$ has its end threaded and passed through an ear, $e$, on the tongue, and provided with a nut, $f$, having a crank or handle, by which it may be turned. After first loosening the eyebolt $d$, so as to release the rod $b$, the frame D, and all the picking mechanism thereon, may be raised or lowered by simply turning the nut $f$. On the frame D there are mounted, side by side, two husking and picking rolls, E and F, which lie transversely of the machine, and in nearly a horizontal position. The ends of the rolls extend out beyond one of the main wheels, as shown in Fig. 1, and they are so arranged that the standing stalks may be passed inward between them from said end. The rolls are provided with longitudinal lips $h$, and are rotated toward each other by means of suitable gearing connecting with the main wheels B.

The standing stalks of corn are passed inward in an inclined or leaning position between the rolls, which pass them down through. As the stalks pass down, the lips $h$ take hold of the ears at the butt, and break the ear or cob from the husks, leaving the latter on the stalk, so that they pass down therewith.

The general construction, arrangement, and operation of these rolls is the same as of those shown in my patent above referred to. There are, however, two material points of difference—first, that in the present machine the rolls are arranged transversely, instead of lengthwise, as in the old machine; and, secondly, that the lips $h$ now have their edges curled outward, as shown in Fig. 6, while in the old machine such was not the case. By placing the rolls transversely I overcome the worst difficulties which were contended with in my former machine.

This arrangement enables the team to walk on one side of the row of corn that is being husked, permits the team to be more easily managed, admits of the reins being arranged in the ordinary manner without breaking down the stalks of corn, and permits the two horses to be connected together by a neck-yoke.

Besides the above advantages of the present arrangement of the rolls, there is another, even more important, viz., that it permits the stalks of corn to be taken in between the picking-rolls by simply leaning them to one side, while in the old machine, having the rolls placed longitudinally, the stalks had to be stopped and broken backward, while the gathering-heads, revolving with great rapidity, were liable to, and frequently did, break the stalks at the joints. In the present machine, the stalks are manipulated with greater ease, and with more certainty of their passing back between the rolls, than in the old machine, owing to the fact that the roots of the stalks are always beyond the ends of the rolls, instead of passing under them, as in the former machine. When the roots of the stalks passed back under the rolls, as in the old machine, there was always a tendency to turn the stalks forward, to counteract which it was necessary to place the rollers close together, and to produce friction against the stalks below the rolls, thereby making the machine run harder than when the rolls are arranged transversely, as in the present machine.

The purpose of giving the tangential lips $h$ of the picking-rolls the outward curve at the edge is to enable them to act upon all kinds of corn, in all kinds of weather. I have found in practice that, in order to have the lips operate properly in all cases, the outward curve or curl of the edge is absolutely necessary. Without the curved edge, the lips will in many cases fail to operate. It is also advantageous to make the lips on one roll larger than those on the other, and to make those on one roll with flat faces, while those on the other have their faces slightly rounded outward, as shown in Fig. 6.

The stalks are caught and fed inward between the rolls by means of gathering-arms H, a revolving head, I, and a spirally-grooved head, J. The arms H are mounted on the end of the frame D, and spread apart at their forward ends, so as to catch all the stalks in the row and guide them against the revolving head I. The arms are arranged with their forward ends close to the ground, so that they run under and lift up all fallen or broken stalks; and, in order that they may not be broken in case the tongue is lowered, or they otherwise come in contact with the ground, they are so arranged that their ends can rise freely. They are also made adjustable, so that their ends may be fixed at the proper height from the ground, notwithstanding the changes which are necessarily made in the height of the frame D and picking mechanism. The rotating head I is mounted on a vertical stud at the outer end of the frame D, and is provided with tangential arms $i$, which take the stalks from between the arms H and carry them back against the spirally-grooved head J, which is mounted on the outer end of the rear picking-roll E, so that it extends out beyond the end of the forward picking-roll F, as shown in Fig. 1. The stalks, being forced into the grooves of the head J, are inclined to one side thereby, and carried inward between the rolls E F at regular distances apart. In order to prevent hanging ears from entering the grooved head I from above, a flat board or cap, M, is secured to the frame above the head, as shown in Figs. 1 and 3. An upright arm, N, is also secured to the frame, in front of the grooved head, as shown in Fig. 1, to prevent ears from being forced into the grooves by the combined action of the front picking-roll F and the lower part of the head or reel I. The cap or board M is a feature of great importance, and can seldom be dispensed with. In front of and parallel with the picking-rolls E F there are mounted two rolls, P and Q, the former having a spiral rib, and the latter a spiral row of teeth from end to end. The purpose of these rollers is to remove any husk and silk that may be left on the ears by the picking-rolls, and to feed the ears to the delivering mechanism. The rib and the teeth wind about the respective rolls in the same direction, and the rolls are arranged to turn toward each other, so that the teeth and the rib meet or intersect each other at short intervals. The ears of corn, falling or sliding down from the picking and husking rolls E F, are stripped of all silk and fragments of husk by the rolls P Q, which also carry the ears inward over their ends, and discharge the refuse matter over the front of the frame. Below and in front of the roll Q there is a row of curved spring-arms, R, which serve to press the refuse matter up against the teeth of the roll. These arms, being elastic, permit fragments of corn-stalks, nubbins, &c., to pass through between them and the roll, and be discharged in the same manner as the husks and silk. The frame D is made tight or close below and in front of the rolls to form a receptacle for the corn which may chance to be shelled. It is provided at the front with a gate or door, $c'$, through which the corn may be removed. The frame D is, of course, made with a slit or opening to permit the entrance of the standing stalks between the picking-rolls E F; but, as shown in Fig. 3, said slit $n$ is made directly under the upper picking-roll—a point so high in the frame that there is no danger of the shelled corn escaping through it. On the front of the frame, over the rolls P Q, there is mounted a bonnet or shield, $o$, extending from end to end of the rolls, to prevent the ears of corn from being turned up on end or thrown from the machine by the rolls. At the inner end of the rolls there is mounted an endless belt or apron, S, provided with transverse teeth for the purpose of carrying the ears of corn from the rolls P Q backward into a box or receptacle, T, which is suspended under the axle, as shown in Figs. 1 and 2. An upright guard-plate, U, is mounted between the ends of the rolls P Q for the purpose of preventing husks, silk, &c., from passing under the belt. The passage of husks, &c., under the belt is also further prevented by a cam or nose, $p$, formed on the roller P at the inner end, and in front of the spiral rib. This nose or cam serves to draw all refuse matter away from the belt, so that it will be caught and carried out by the roll Q. The corn box or receptacle T is suspended from the rear ends of the tongue-bars C by arms $r$ pivoted thereto, and is provided at its rear end with an upright arm, $s$, by which it can be tilted to discharge its contents. A seat, V, for the operator is mounted on two standards, $t$, secured to the main axle A, as shown in Figs. 1 and 2. One of the seat-standards is provided with a plate, $u$, against which the arm $s$ of the corn-box locks, as shown in Figs. 1 and 5. The operator while on his seat can with one foot lock and unlock the arm $s$, and operate the same to tilt the corn-box. On the front of the frame, to the bonnet or shield $o$, there is secured a curved plate, Y, extending from the head I to the tongue C, for the purposes of turning up the hanging ears as the stalks are carried down, and of preventing the ears from catching against, and being broken off by, the front of the frame. The manner in which the gathering-arms H are supported and made adjustable is clearly shown in Figs. 1 and 2. They are both pivoted or jointed to the frame at their rear ends, in order that their forward ends may rise and fall. The inner arm has its front end upheld by a chain, $a'$, connected to the front of the frame, while the outer arm is supported by a brace, $b'$, the rear end of which is provided with a screw-thread and a nut, $c'$, and passed through a stud, $d'$, against which the nut bears, as shown in Fig. 1.

By lengthening or shortening the chain, and adjusting the nut, the arms may have their points raised or lowered, as required.

It is obvious that in constructing the machine the rolls may be given any suitable inclination, and that the rolls P Q may have two or more ribs and rows of teeth, respectively.

Having described my invention, what I claim is—

1. A corn harvesting and husking machine having two transverse picking and husking rolls, and so constructed that the stalks of corn while standing in the ground may enter between the rolls, substantially as shown and described.

2. The picking and husking rolls E F, having the edges of their lips $h$ curled outward, as shown and described, and for the purpose set forth.

3. In combination with the transverse picking and husking rolls E F, the spirally-grooved head J, extending out in line with the rear roll, beyond the end of the forward roll, as shown.

4. In combination with the transverse picking and husking rolls E F, the spirally-ribbed roll P and spirally-toothed roll Q, located in front of and parallel with said picking-rolls, for the purposes of removing silk, &c., from the ears and conveying the latter to the side of the machine, as set forth.

5. The combination of the transverse rolls E F, grooved head J, rotating head I, and gathering-arms H, all constructed and arranged substantially as described.

6. In combination with the transverse picking and husking rolls E F, the spirally-ribbed and spirally-toothed rolls P and Q, the belt S, and receptacle T, arranged as shown.

7. The guard U, secured between the rolls P Q to prevent husks, &c., from passing under the belt S, as set forth.

8. In combination with the transverse rolls, arranged and operating as described, the closed frame D, having the slit $n$, in which the stalks enter, located directly under the rear roll, as shown and described, to prevent the waste of shelled corn.

9. The guard N, located in front of the spirally-grooved head J, as and for the purpose set forth.

SAMUEL PATTON.

Witnesses:
GEO. A. BANGS,
CHARLES TRUE.